United States Patent [19]

Maslyaev et al.

[11] Patent Number: 4,490,274

[45] Date of Patent: Dec. 25, 1984

[54] OXYGEN-GENERATING CHEMICAL COMPOSITION

[75] Inventors: Viktor S. Maslyaev; Evgeny S. Sagalovsky; Galina P. Khudosovtseva; Petr M. Gorovets; Ljudmila Y. Filimonova; Ljubov A. Zborschik, all of Donetsk, U.S.S.R.

[73] Assignee: Vsesojuzny Nauchno-Issledovatelsky Institut Gornospasatelnogo Dela, Donetsk, U.S.S.R.

[21] Appl. No.: 501,720

[22] Filed: Jun. 7, 1983

[30] Foreign Application Priority Data

Jan. 17, 1983 [SU] U.S.S.R. ............................. 3530203

[51] Int. Cl.³ .................. C01B 15/043; C01B 13/02; C09K 3/00
[52] U.S. Cl. ........................ 252/186.22; 252/186.21; 252/186.38; 252/186.43
[58] Field of Search ................. 252/186.38, 186.21, 252/186.22, 186.43

[56] References Cited

U.S. PATENT DOCUMENTS

| | | | |
|---|---|---|---|
| 2,245,495 | 6/1941 | Pemble | 252/186.38 X |
| 2,401,484 | 6/1946 | Jackson | 252/186.38 X |
| 3,502,429 | 3/1970 | Sanders | 252/186.22 X |
| 3,702,305 | 11/1972 | Thompson | 252/186.38 X |
| 3,920,803 | 11/1975 | Boryta | 252/186.38 X |
| 4,113,646 | 9/1978 | Gustafson | 252/186.21 X |

FOREIGN PATENT DOCUMENTS

| | | |
|---|---|---|
| 86138A2 | 8/1983 | European Pat. Off. |
| 2164988 | 8/1973 | France |
| 51-91891 | 8/1976 | Japan |
| 51-125686 | 11/1976 | Japan |

*Primary Examiner*—Benjamin R. Padgett
*Assistant Examiner*—Virginia B. Caress
*Attorney, Agent, or Firm*—Ladas & Parry

[57] ABSTRACT

A chemical composition comprising oxygenic ingredients and activators which, when activated, generates oxygen for use in breathing mixtures, the oxygenic ingredients being potassium superoxide and sodium peroxide and the activators being aluminum hydroxide, manganese dioxide and powdered aluminum all taken in a proportion as follows, wt. %:
sodium peroxide, $Na_2O_2$, 10-20;
aluminum hydroxide, $Al(OH)_3$, 15-25;
manganese dioxide, $MnO_2$, 5-7;
powdered aluminium, Al, 2.5-3.5;
potassium superoxide, $KO_2$, the balance.

1 Claim, No Drawings

OXYGEN-GENERATING CHEMICAL COMPOSITION

FIELD OF THE INVENTION

The present invention relates to chemical compositions generating oxygen for use in breathing mixtures. It may be used to advantage in self-contained breathing apparatus of the type employing chemically-fixed oxygen to supply oxygen during the initial stage of operation. The invention may find application also in breathing apparatus of other type providing an ample supply of oxygen within a short period of time. This requirement is to be met before all in the self-rescuers worn during mine accidents when a fire or gas outburst render the atmosphere unsuitable for breathing.

BACKGROUND OF THE INVENTION

At present, known in the art are chemcial compositions, serving the same purpose which generate oxygen suitable for breathing. Described in a French Pat. No. 2,164,988; Cl. A62d 9/00 is a chemical composition in the form of pressed bricks which generate breathing oxygen. The composition in parts by weight is as follows: sodium chlorate, 92; a 1:1 mixture of silicon and magnesium, 3; cupric oxide, 1; nickel oxide 4. The ingredients of a specified grading are mixed up, heated to 200° C. and pressed. The bricks thus produced are used as generators of breathing oxygen on being heated in any way, for the reaction of oxygen liberation must be induced by an increase in temperature. The liberation of chlorine during the reaction of decmposition is a disadvantage, for much of the composition goes to neutralize the chlorine.

Another known composition of the same kind is one due to T. L. Thompson which is disclosed in U.S. Pat. No. 3,702,305. It is composed basically of an oxygenic substance—chlorate of an alkali metal or sodium peroxide—taken in an amount between 1.0 and 20 wt.% (or a mixture of sodium oxide and sodium peroxide, 0.5 to 20 wt.%), perchlorate of an alkali metal, 15 wt.% and an activator containing sodium chlorate and sodium oxide (or a mixture of oxides) as a catalyst. The reaction between the sodium oxide and sodium chlorate is an exothermic one and so is the reaction of oxidation of the sodium oxide. The heat thus liberated brings about the decomposition of the oxygenic substance which is sodium chlorate decomposing at 350° C.

The disadvantage of Thompson's composition is the possibility of liberation of free chlorine which is toxic and calls for employing efficient absorbers to keep the breathing mixture pure. This composition also lacks a moisture-containing component liberating moisture which is required to activate the regenerative composition based on potassium superoxide during the initial period of operation of the breathing apparatus. The composition is also unsuitable for use at ambient temperature to −5° C.

SUMMARY OF THE INVENTION the object of the present invention is to provide a chemical composition capable of generating, when activated, oxygen in an amount sufficient to obtain a breathing mixture and displaying the following properties:

freedom from the tendency to form toxic gases during the decomposition;

moisture-generating capacity (applies to the compounds based on potassium superoxide for use on self-contained breathing apparatus employing chemically-fixed oxygen);

adequate decomposition rate at temperatures to −10° C.

The essence of the invention consists in that in a chemical composition which generates oxygen on being activated, finds application in breathing mixtures and comprises oxygenic ingredients as well as activators, the oxygenic ingredients are potassium superoxide and sodium peroxide and the activators are aluminium hydroxide, manganese dioxide and powdered aluminium all taken in a proportion as follows, wt.%:

sodium peroxide, $Na_2O_2$, 10–20;
aluminium hydroxide, $Al(OH)_3$, 15–25;
manganese dioxide, $MnO_2$, 5–7;
powdered aluminium, Al, 2.5–3.5;
potassium superoxide, $KO_2$, the balance.

This composition not only yields breathing oxygen but also generates moisture into the breathing mixture—a factor of paramount importance if the composition is used for starting a breathing apparatus—and gives reliable performance at temperatures to −10° C.

DETAILED DESCRIPTION OF THE INVENTION

A preferred embodiment of the invention will now be described in detail by way of examples.

Among the various applications of the disclosed oxygen-generating compound, one envisages its use as the material of the so-called "starting bricks" based on potassium superoxide which are employed in breathing apparatus operating on chemically-fixed oxygen. Supplying within a short interval of time oxygen in an amount sifficient for breathing, the starting bricks must neither contain toxic impurities nor decmpose on their own accord at low or high temperatures. They also must generate moisture during the initial period of operation of a breathing apparatus.

These requirements are met by the starting bricks prepared from the disclosed composition containing potassium superoxide and sodium peroxide as the oxygenic ingredients and aluminium hydroxide, manganese dioxide and powdered aluminium as the activators all taken in a proportion as follows, wt.%:

sodium peroxide, $Na_2O_2$, 10–20;
aluminium hydroxide, $Al(OH)_3$, 15–25;
manganese dioxide, $MnO_2$, 5–7;
powdered aluminium, Al, 2.5–3.5;
potassium superoxide, $KO_2$, the balance.

The use of potassium superoxide and sodium peroxide as the oxygenic ingredients eliminates the possibility of liberation of toxic gases, for these compositions display a better reactivity than the chlorates of alkali metals.

The activators are included into the disclosed composition due to the following reasons. The aluminium hydroxide is a source of the moisture required for the generation of oxygen from the starting brick and the activation of the regenerative composition based on potassium superoxide in the breathing apparatus at the initial stage of operation. The manganese dioxide serves as a catalyst facilitating the decomposition of the sodium peroxide since the latter in the solid state does not fully give off oxygen.

The disclosed composition is prepared by mixing the starting materials of a given grading, and the starting bricks of a specified size and shape are produced by pressing at a given pressure.

In the preferred embodiment of the invention described hereinabove, each of the starting bricks prepared from the disclosed composition has been placed into a wiregauze container with a lid inserted then into a socket of a regenerative canister.

EXAMPLE 1

The starting bricks, each of a 44-or 45-g mass, were prepared from the disclosed composition with the ingredients taken in a proportion as follows, wt.%:
 potassium superoxide, 50.0;
 sodium peroxide, 16.5;
 aluminium hydroxide, 25.0;
 manganese dioxide, 5.0;
 powdered aluminium, 3.5.

Oxygen generated in the decomposition of the starting bricks did not contain toxic constituents. In gas samples taken 10–12 s after the commencement of the decomposition no constituents other than water vapours were identified. Maximum mass concentration of water vapours in gas at 20° C. and 101.3 kPa (760 mm Hg) amounted to 100 mg/l. The volume of generated oxygen was 5.6–5.7 l (here and hereafter the volume is reduced to normal conditions), time of oxygen generation was 30–32 s at 20–25° C. and 43–45 s at $-10°$ C. The thermal stability of the starting bricks varied between 98° and 102° C. In the course of decomposition the brick mass neither bulged nor spread.

EXAMPLE 2

The starting bricks, each of a 44–45-g mass were prepared from the disclosed composition with the ingredients taken in a proportion as follows, wt.%:
 potassium superoxide, 56.0;
 sodium peroxide, 20.0;
 aluminium hydroxide, 15.0;
 manganese dioxide, 6.0;
 powdered aluminium, 3.0.

The volume of generated oxygen was 5.3–5.5 l, time of oxygen generation was 52–55 s at 20°–25° C. and 67–70 s at $-10°$ C. The thermal stability of the starting bricks varied between 98° and 102° C. In the course of the decompsition the brick mass neither bulged nor spread.

EXAMPLE 3

The starting bricks, each of a 44–45-g mass, were prepared from the disclosed composition with the ingredients taken in a proportion as follows, wt.%:
 potassium superoxide, 60.0;
 sodium peroxide, 10.0;
 aluminium hydroxide, 20.5;
 manganese dioxide, 7.0;
 powdered aluminium, 2.5.

The volume of generated oxygen was 6.1–6.3 l, time of oxygen generation was 63–65 s at 20–25° C. and 73–75 s at $-10°$ C. The thermal stability of the starting bricks varied between 98° and 102° C. In the course of the decomposition the brick mass neither bulged nor spread.

EXAMPLE 4

The starting bricks, each of a 44–45-g mass, were prepared from the disclosed composition with the ingredients taken in a proportion as follows, wt.%:
 potassium superoxide, 67.5;
 sodium peroxide, 10.0;
 aluminium hydroxide, 15.0;
 manganese dioxide, 5.0;
 powdered aluminium, 2.5.

The volume of generated oxygen was 5.9–6.1 l, time of oxygen generation was 190–210 s at 20°–25° C. The thermal stability of the starting bricks varied between 98° and 102° C. In the course of the decomposition the brick mass neither bulged nor spread.

EXAMPLE 5

The starting bricks, each of a 44–45-g mass, were prepared from the disclosed composition with the ingredients taken in a proportion, as follows, wt.%:
 potassium superoxide, 44.5;
 sodium peroxide; 20.0;
 aluminium hydroxide, 25.0;
 manganese dioxide, 7.0;
 powdered aluminium, 3.5.

The volume of generated oxygen was 5.4–5.6 l, time of oxygen generation was 28–30 s at 20°–25° C. and 45–48 s at $-10°$ C. The thermal stability of the starting bricks varied between 98° and 102° C. In the course of the decomposition the brick mass neither bulged nor spread.

Thus, it stands to reason that the starting bricks prepared from the disclosed compound and described above as a preferred embodiment of the invention not limiting the scope thereof fully satisfy the requirements to be met in designing the self-contained breathing apparatus which employ chemically-fixed oxygen and operate on potassium superoxide.

What is claimed is:

1. A chemical composition which generates oxygen on being activated, for use in breathing mixtures which comprises oxygenic ingredients as well as activators, the oxygenic ingredients being potassium superoxide and sodium peroxide and the activators being aluminium hydroxide, manganese dioxide and powerded aluminium all taken in a proportion as follows, wt.%:
 sodium peroxide, $Na_2O_2$, 10–20;
 aluminium hydroxide, $Al(OH)_3$, 15–25;
 manganese dioxide, $MnO_2$, 5–7;
 powdered aluminium, Al, 2.5–3.5;
 potassium superoxide, the balance.

* * * * *